(12) United States Patent
Pieper

(10) Patent No.: US 6,390,898 B1
(45) Date of Patent: May 21, 2002

(54) METHOD AND DEVICE FOR TREATING, ESPECIALLY CLEANING, ABRASIVE CLEARING OR STRIPPING OF COATINGS, GRAFFITI OR OTHER SUPERFICIAL SOILING ON PARTS, WORK PIECES OR SURFACES

(76) Inventor: Gerard Pieper, Gerberstrasse 5d, D-03222 Lübbenau (DE)

(*) Notice: Subject to any disclaimer, the term of this patent is extended or adjusted under 35 U.S.C. 154(b) by 0 days.

(21) Appl. No.: 09/529,340
(22) PCT Filed: Oct. 19, 1998
(86) PCT No.: PCT/DE98/03106
§ 371 Date: Apr. 11, 2000
§ 102(e) Date: Apr. 11, 2000
(87) PCT Pub. No.: WO99/20435
PCT Pub. Date: Apr. 29, 1999

(30) Foreign Application Priority Data

Oct. 19, 1997 (DE) .......................... 197 47 838

(51) Int. Cl.[7] .............................. B24C 3/00
(52) U.S. Cl. ....................... 451/75; 451/100
(58) Field of Search .................. 451/75, 100

(56) References Cited

U.S. PATENT DOCUMENTS

| | | | |
|---|---|---|---|
| 3,675,374 A | * 7/1972 | Wilder | 451/100 |
| 4,389,820 A | * 6/1983 | Fong et al. | 451/75 |
| 4,470,226 A | * 9/1984 | Williams | 451/92 |
| 4,646,482 A | 3/1987 | Chitjian | |
| 5,107,630 A | * 4/1992 | Lodewijk | 451/75 |
| 5,201,150 A | * 4/1993 | Kuboyama et al. | 451/100 |
| 5,218,791 A | * 6/1993 | Parent et al. | 451/75 |
| 5,433,653 A | * 7/1995 | Friess | 451/100 |
| 5,445,553 A | * 8/1995 | Cryer et al. | 451/75 |
| 5,632,150 A | * 5/1997 | Henzler | 451/75 |
| 6,036,584 A | * 3/2000 | Swinkels et al. | 451/75 |
| 6,238,268 B1 | * 5/2001 | Wern | 451/75 |

FOREIGN PATENT DOCUMENTS

| | | |
|---|---|---|
| BE | 713294 | 8/1968 |
| CH | 314063 | 7/1956 |
| DE | 29 16 131 A1 | 11/1979 |
| DE | 34 13 576 A1 | 10/1985 |
| DE | 40 03 324 A1 | 8/1991 |
| DE | 40 14 085 C1 | 11/1991 |
| DE | 4407 956 A1 | 9/1995 |
| DE | 196 14 555 A1 | 10/1997 |
| EP | 0 324 448 A1 | 7/1989 |
| WO | WO 96/00138 | 1/1996 |
| WO | WO 96/14962 | 5/1996 |

* cited by examiner

*Primary Examiner*—Derris H. Banks
*Assistant Examiner*—Hadi Shakeri
(74) *Attorney, Agent, or Firm*—Herbert Dubno

(57) ABSTRACT

The invention relates to a method and device for treating, especially cleaning, abrasive clearing or removing of coatings (1), graffiti or other superficial soiling on parts, work pieces or surfaces (3). A blasting means (2) is gravity fed from a holding container (11) to a carrying air stream (5) which is transported inside a hose guiding system constructed with outgoing and incoming lines. The blasting means are fed through said carrying air flow by low pressure, and, in a blasting chamber (25), are blasted against the surface (3) which is to be treated through a blasting lance (22). From the blasting chamber, said blasting means are transported back to the carrying air stream (5) in such a way that the blasting means (2) are circulated. The acceleration of the blasting means is essentially generated by the low pressure applied on the blasting chamber (25) and by increasing the blasting velocity in an acceleration section (L) by reducing the diameter of the outgoing line in the acceleration section (L). The low pressure outgoing line (20) is connected to a linear acceleration tube (21) which forms an acceleration section (L). The acceleration tube which comprises a diameter reduction compared to that of the outgoing line is arranged before said blasting lance (22).

39 Claims, 7 Drawing Sheets

METHOD AND DEVICE FOR TREATING, ESPECIALLY CLEANING, ABRASIVE CLEARING OR STRIPPING OF COATINGS, GRAFFITI OR OTHER SUPERFICIAL SOILING ON PARTS, WORK PIECES OR SURFACES

CROSS REFERENCE TO RELATED APPLICATIONS

This application is a national stage of PCT/DE98/03106 filed Oct. 19, 1998 and based upon German application 197 47 838.7 of Oct. 19, 1997 under the International Convention.

FIELD OF INVENTION

The invention relates to a method for treating and, especially, for the cleaning, abrasive stripping or clearing of coatings, graffiti or other superficial contamination on parts, workpieces or surfaces made of stone, concrete, wood, metal, plastic, glass, ceramic or paper, whereby a blasting agent is gravity fed from a supply container to a carrying air stream which is guided inside a hose system consisting of incoming and outgoing lines, transported by means of negative pressure through the same and blasted from a blasting chamber through a blasting lance against the surface to be treated, and from there transported back into the carrying air stream, so that the blasting agent in recirculated.

The invention relates also to a device for implementing the method with a supply container with a conically shaped lower end as a discharge funnel provided with an outlet opening for feeding a fine-grained and/or coarse-grained blasting agent, which by gravity reaches the outlet opening of the discharge funnel, which via a flexible incoming line for the transport of the blasting agent is connected with a blasting chamber, which can be evacuated by means of an underpressure-producing aggregate and accommodate the parts and surfaces, which in turn is connected with an outgoing underpressure line, whereby through an opening in the blasting chamber a blast lance connected with the incoming underpressure line provided with a nozzle is guided.

The invention relates also to the use of sodium hydrogen carbonate, thermoset plastic particles, ash, comminuted fine-grained slag, corundum, quartz, metallic particles, glass beads, vegetable/organic particles or mixtures thereof for the removal of paint, spray paint, graffiti or other contaminants.

BACKGROUND OF THE INVENTION

It is known to remove coatings or other contaminants such an deposits from walls with a blasting treatment with grains blasting agents which are blasted with an overpressure of 10 to 300 bar against the object to be blasted. The blasting agent, mostly fine-grained sand or metal particles, is transported to the blasting location with a copressed air stream (see DE 31 27 012 A1, DE 34 13 576 A1, DE 37 38 246 A1, DE 40 03 324 A1, DE 40 14 085 C1, DE 41 43 113 C; DE 42 01 860 C1).

From DE-OS 29 16 131 a surface is treated with the aid of a container provided at its lower end with a discharge funnel with an outlet for a grinding agent, with a pistol guiding the grinding agent unto the surface to be treated. The pistol is traversed by a channel at whose end a compressed-air source is connected. An incoming line connects the outlet of the container with the channel in the pistol at a point upstream of the connection with the compressed-air source. An opening is provided in the incoming line close to the outlet, through which the atmospheric pressure is in communication with the incoming line, so that the compressed air which flows through the pistol channel and over the end of the incoming line generates a negative pressure in the incoming line which sucks air through the opening, whereby the grinding agent is aspirated through the outlet and blasted against the surface to be treated at the other end of the pistol channel.

The barrel of the pistol is surrounded by a hood, which can be positioned on the surface to be treated. From the hood a return line leads to the container, on which also a vacuum source is connected, which generates a negative pressure over the stored grinding agent, which aspirates from the hood the materials blasted against the surface to be treated.

With this known system two circuits are established, a negative pressure circuit for the aspiration of the used blasting material and an overpressure circuit which accelerates the blasting material to the necessary blasting velocity, whereby the addition of the blasting material in the overpressure circuit is performed with the negative pressure created by the overpressure. Both circuits are separated from each other by the blasting material stored in the container acting as a pressure barrier.

Finally for the production of the necessary blasting velocity, this known system also works with an overpressure which must be delivered to the blasting pistol and is energy consuming. The additionally required negative pressure generator in the collection container complicates matters even more.

Due in part to the considerable overpressure the blasting agents have a high impact energy, which in the case of a sensitive substrate, for instance plastic surfaces, can lead to damage or even destruction. A gentle detachment without damage to the substrate is not possible.

A further disadvantage in that a separation of the detached lacquer layer from the blasting material does not take place, i.e. the contaminated blasting material has to be discarded and replaced.

From the DE-OS 44 07 956 a sand blasting box is known for the surface treatment of preferably flat material surfaces, which on its frontal side has an opening whereinto the frontal end of a sand blasting pistol connected to a compressed-air source is introduced. The rear side of the sand blasting box has a treatment window with an elastic sealing strip, which can be positioned over the material surface to be treated. The blasting sand is directed by means of compressed air, i.e. under overpressure, onto the surface to be treated. A commercially available household vacuum cleaner in connected to the sand blasting box. which produces a negative pressure in the blasting box and aspirates the blasting material. The barrel of the blasting pistol is guided in the blasting box by means of a rubber diaphragm arranged at the end and is capable of swinging motion in order to project the blasting material at various angles and distances onto the treatment surface.

Also in this known solution the blasting material receives its blasting and moving energy through overpressure. Again two separate circuits are required, namely an overpressure circuit in the form of a compressed-air stream for the transport of the sand to the pistol and a negative pressure circuit for the aspiration of the sand exiting the pistol. Therefore the costs are high.

After blasting the blasting material is contaminated with the removed matter. There is no separation, so that also in this system the blasting material has to be discarded or separately processed again. The stream of blasting material created by the overpressure is extremely energy-rich and not suited for the detachment of coating from problematic soft substrates, because it in not possible to adjust the blasting energy.

The DE 36 29 623 A1 discloses a device for cleaning of surfaces of large objects with a granular blasting agent, with a blasting basket movable parallel to the object surface, wherein over an open side a blast against the surface of the object can be created and which captures and evacuates the particles of blasting material with the detached dirt particles ricocheting from the material surface. This apparatus is connected with an operator cabin equipped with observation windows, so that the installation is in plain view of the operator and forms a mobile work unit together with the cabin. The blasting space is connected via a flexible line with a negative pressure space, wherein separating devices for the separation of the exhaust air, recyclable blasting agents and residuals are provided. The recycled blasting agent is guided towards a spinner, whose rotational velocity sets the blasting intensity.

A recirculation of the blasting agent is achieved, but here too a circuit for the aspiration of used blasting agent through negative pressure and a circuit for the actuation of a blasting turbine with a spinner are required. The blasting agent receive its energy through the rotation of the spinner, which in expensive from the point of view of equipment and control technology. For the removal of for instance graffiti such a construction is much too complicated and consumes too much energy.

DE 196 14 555 A1 describes a device and a method for the abrasive blasting, particularly sand blasting, of workpieces, especially smaller workpieces, for instance in the hobby field.

The device described in this reference consists of a chamber substantially airtight on all sides with at least one, preferably more closable openings, whereby the chamber can be evacuated, a container for receiving the blasting agent, a blasting pipe unit, which can be introduced into the chamber through one of the displaceable openings and which has an inlet for the blasting agent and an inlet for air and an outlet opening for the blasting agent, whereby the inlet for the blasting agent can be connected with the blast agent container via an incoming line. The blasting pipe unit has a pipe-like main part with an inlet for the blasting agent, an air inlet opening and an outlet opening, respectively nozzle for the blasting agent and the aspired air. After the introduction of the blasting pipe unit through one of the chamber openings, the air inlet opening is outside the chamber and the air outlet opening is inside the chamber. By means of a commercially available vacuum cleaner connected to the chamber atmospheric air is aspirated through the air inlet opening, due to the negative pressure in the chamber the blasting agent in transported from the container through the incoming line and through the outlet opening of the blasting pipe unit in the chamber it is guided onto the work piece to be treated. With the vacuum cleaner the air and the blasting agent are aspirated from the chamber and caught in the filter of the vacuum cleaner.

The apparatus described in DE 196 14 555 A1 has the drawback that the achieved blasting velocities are sufficient only for the cleaning of small workpieces. This solution is not suited for large workpieces or surfaces. Besides the blasting process can be performed only as long as the supply of blasting agent in the container lasts.

The blasting material contaminated with dirt is merely disposed of in the vacuum cleaner. A separation of the blasting material from the contamination does not take place, just as there is no return of the blasting material to the blasting circuit.

This proposed solution is not suited for a large-surface blasting treatment, such as for instance surfaces defaced by graffiti spraying, The same applies to larger parts or workpieces.

OBJECT OF THE INVENTION

It in the object of the invention to improve a method and a device of the kind mentioned in the introduction, so that coatings, paint, dirt and deposits on parts or on flat or curved open and/or closed surfaces can be removed without overpressure and high pressure generators, energetically, gently and free of dust, with no or with insignificant detriment to the substrate, with low energy consumption, high flexibility and environmentally safe recovery and recycling of the blasting agent.

SUMMARY OF THE INVENTION

According to the invention this object in achieved in that the acceleration of the blasting agent is essentially produced by the negative pressure applied to the blasting chamber and by increasing the blasting velocity in an acceleration section by means of diameter reductions from the incoming line to the acceleration section.

In a preferred embodiment of the method of the invention, the negative pressure in circulation is set at 50 to 300 mbar, the blasting agent is added by gravity and/or underpressure in an amount of 0.01 to 25% by volume of the carrying air stream, with or without cleaning fluid, the blasting-agent/air mixture is rectilinearly accelerated without deflection to a blasting velocity of 20 to 80 m/s prior to its impact on the treatment surface. After that, the blast agent and air are directed onto the treatment surface with a rhythmically repeated back and forth motion over the treatment surface under surveillance, or the treatment surface is set to rotate and/or to swing in the blasting-agent/air mixture. The blasting-agent/air mixture together with the detached dust, dirt or the removed matter is aspirated due to the produced underpressure and set into rotation in such a way that the blasting agent in separated due to its higher mans from the blasting-agent/air mixture. The particles of the blasting agent are collected, optionally dried and again fed into the volume of carrying air stream due to gravity and/or underpressure, and the remaining dust/air mixture is subjected to a fine cleaning in the wet and/or dry extractor, and fresh air and/or optionally the separated air are then again. fed into the circuit, cooled or heated.

In a further preferred feature the acceleration of the blasting agent takes place in the rectilinear acceleration section inside the incoming underpressure line, prior to its entering the blasting lance.

According to a further preferred embodiment, at a constant volume flow the blasting agent is additionally accelerated due to a diameter reduction in the incoming line down to 0.1 to 0.9 times of its diameter (d1) over a length of equalling 5 to 50 times the inner diameter (d2) of the diameter-reduced incoming line.

Therefore the velocity of the blasting agent can be correspondingly increased prior to its entering the blasting lance, and the specific impact energy of the blasting particles can be extremely sensitively adjusted by altering the diameter ratio d2:d1, the length of the acceleration section and the distance of the frontal end of the blasting lance from the treatment surface.

With the method of the invention it becomes therefore possible to adjust the kinetic energy of the blasting particles to the type, size and configuration of the coating and the substrate.

Blasting agent such as sodium hydrogen carbonate, plastic particles, preferably duroplastic particles, ashes, comminuted fine-grained slag, corundum, quartz, metallic particles, glass beads, vegetable/organic particles or mixtures thereof are particularly well suited for an adjustment of the blasting velocity through diameter reduction.

Depending on the kind of blasting particles and the imparted blasting velocity, with the method of the invention it is possible to abrasively remove coatings from metal, spray paint from plastic, inscriptions on paper, weathering deposits on stone, dirt deposits on concrete, if necessary without the abrasion of the substrate, or with substrate abrasion also to remove rust layers from metals. The abrasiveness of the method of the invention depends in a decisive measure on the blasting energy transmitted to the blasting particles and on their type.

The method of the invention is characterized in that the blasting energy can be varied in accordance with the nature of the substrate, the characteristics of the blasting agent and the kind of the coating to be removed, so that also problematic grime, such as for instance repeated coats of paint, can also be detached from the substrate, without destroying the substrate or causing any significant damage.

The treatment effect of the blasting particles in further improved according to the invention, when the blasting agent is wetted prior to its acceleration with conventional cleaning fluids.

Primarily in the case of graffiti defacing of larger surfaces a blasting chamber is sealingly and displaceably positioned on the substrate to be treated, evacuated and the blasting-agent/air mixture is moved back and forth over the treatment surface.

The back and forth motion acts an a pendulum and/or swinging motion of the blasting-agent/air mixture in the blasting chamber within a limited angle range within a cone with an opening angle of 30° to 120°, preferably 90°.

The sliding motion of the blasting chamber from one treatment surface to another is preferably performed under the applied negative pressure. Naturally it is also possible to perform the displacement of the blasting chamber under atmospheric pressure with a short circuit, without leaving the framework of the invention.

In cases where the workpieces have to be treated for deposits or rust according to the method of the invention, the workpieces are in addition set to rotate or swing in the blasting-agent/air mixture. This can be done stationarily or also by displacing the blasting chamber.

After the blasting agent has hit the respective treatment surface, it is discharged from the blasting chamber due to the applied underpressure, separated from the air stream, optionally cleaned and returned to the circuit. The carrying air can escape into the environment or, according to a special feature of the invention, it is returned to the underpressure circulation after being either heated or cooled, to the extent that the treating of the treatment surface requires a specific temperature. This enhances considerably the efficiency of the treatment.

A particular advantage of the implementation of the method of the invention is that commercially available units can be used without alteration. Depending on the required air output, they are laid out in a single or in multiple steps.

Particularly good treatment results are obtained in the removal of for instance thin paint layers from sheet metal surfaces when to the volume flow of the air carrier 0.013% blasting agent is added.

The object of the invention is further achieved by means of a device with the following features:

a) the incoming underpressure line in connected to an accelerating tube forming a rectilinear acceleration section, which is arranged upstream of the blasting lance and which has a reduced diameter with respect to the incoming line;

b) the incoming underpressure line connected to the outlet opening of the container discharge funnel is provided with a dosage device and/or an injector for the dosage of the blasting agent in circulation;

c) the outgoing underpressure line is connected with at least one further container arranged on the container discharge funnel, which in turn has a conical discharge funnel and is connected with the aggregate producing the negative pressure, whereby the outgoing underpressure line engages tangentially through the container shell into a separator; and d) upstream in the incoming underpressure line a wetting device is integrated, which can be coupled and uncoupled for the wetting of the blasting agent with cleaning fluid.

In a further preferred embodiment of the device of the invention, the acceleration tube extends over a length which is 5 to 50 times the inner diameter $d_1$ of the incoming underpressure line, whereby the acceleration tube has an inner diameter $d_2$, which is 0.1 to 0.9 times the inner diameter $d_1$ of the incoming underpressure line.

According to yet another preferred embodiment, the acceleration tube can also be directly connected to the dosage device and/or the injector. There should be a rectilinear acceleration section of sufficient length allowing the blasting agent to assume the required blasting velocity.

The length of the acceleration section can be variable, in that an extensible telescopic tube can form the acceleration tube.

In a further embodiment of the invention, the blasting lance reaching into the blasting chamber in pivotable within a cone of approximately 90° inside the blasting chamber and is adjustable to various blasting distances. Furthermore the pivotability of the blasting lance is made visible from the outside due to illumination, so that also problem spots can be treated individually.

A further suitable embodiment of the invention provides that the container for the supply of the blasting agent is equipped with an independent ventilation open towards the atmosphere.

The blasting chamber in provided with a funnel which collects the blasting agent ricocheting from the treatment surface and makes sure that the blasting agent reaches the outgoing underpressure line via the suction nozzle.

In a further embodiment of the device of the invention, the blasting chamber consists of a blasting bell open on one side and having a collection funnel, whose open side can be positioned on the treatment surface sealingly under applied underpressure and slidably thereon.

In a further suitable embodiment of the invention, the open side of the blasting bell is associated with a suction plate for sealing a surface to be blasted which in provided with openings.

When for instance a wire mesh has to be cleaned of lacquer and rust coatings, the suction plate is flexible. The suction plate has a covering layer of closed-cell foam rubber. The open side of the blasting bell is positioned on the wire mesh and covered with the suction plate. When underpressure is applied, the covering layer of the suction plate applies itself sealingly to the wire mesh and the bell walls, so that the blasting bell is evacuated. In this way the wire mesh is treated in a simple and advantageous way.

According to a further advantageous embodiment of the device of the invention, the bell walls positioned on the treatment surface are provided with sealing elements which, when underpressure is applied, safely seal off the inner space of the blasting bell against the outer atmospheric pressure.

Preferably the sealing elements consist of closed-call foam rubber, foils, brushes, rubber lips, packed sealing elements, latex hoses, rubber or profile seals which adjust easily to the irregularities of the substrate.

These sealing elements can be detachable from the frontal bell wall, so that in the came of different surface configurations they can easily be exchanged without problems.

In a further feature, the blasting bell applicable to flat treatment surfaces has walls whose and surfaces are even with respect to each other.

For problem areas such an corners, edges or curved treatment surfaces, these walls are convex, concave or V-shaped with respect to each other or provided with articulations which adjust easily to the different surface configurations. This make the use of the device of the inventions particularly effective in corner and edge areas.

A further preferred embodiment of the device of the invention provides a closed blasting chamber, consisting of a stationary or mobile hood and a collection funnel equipped with a suction connection piece applied to the hood, while in the connection plane between hood and funnel a blasting table is arranged.

For the treatment of plastic or metal work pieces, in a preferred feature of this kind of blasting chamber, the blasting table in a rotary plate, whose drive axle is guided into the funnel axle and is connected with a drive fastened to the suction connection piece.

The blasting table can be a swingable plate, which swings about an axis in the connection plane.

With such a rotatable or swingable blasting table special workpieces with a complicated surface structure and shape can be treated quickly and without problems.

To the extent that the type and nature of the surface coating to be detached requires the wetting of the blasting agent with chemicals or cleaning fluids, it is further provided by the invention that a wetting device for the blasting agent be integrated in the incoming underpressure line, downstream of the acceleration section.

In a preferred embodiment of the invention, the acceleration tube and the blasting lance are detachable from each other. This has the advantage that acceleration tubes with various lengths and various inner diameters can be used, so that depending on the type of the substrate, of the coating and of the blasting agent, the required blasting velocity can be set in a dosed manner.

However the acceleration tube and the blasting lance can also be made in one piece. This is connected with the advantage that the blasting lance can be utilized for the length of the acceleration tube, and overall length can be shortened. However then blasting lances with different lengths and different inner diameters have to be made available.

According to a further preferred feature of the device of the invention, the opening of the blasting lance facing the treatment surfaces in provided with a nozzle which can be exchanged.

Depending on the nature of the surface and the type of coating, respectively grime, different nozzle sizes can be affixed to the blasting lance, so that the blasting agent load in the carrying air stream can be correspondingly variable.

The blasting lance is guided through an opening in the blasting bell wall, is sealingly held and swingably supported therein.

According to a preferred embodiment of the invention, this can be done with a ball-and-socket joint arranged in the opening of the blasting chamber wall, as well as with a seal surrounding the opening, flanged to the front wall of the blasting chamber, preferably a shaft seal.

The blasting lance can be equipped with a stop which allows for a change in the blasting distance between the blasting lance opening or the blasting lance nozzle and the treatment surface.

Advantageously the stop is arranged on the blasting lance so that it can slide and be fixed in place, so that the required blasting distance can be precisely set.

It can be suitable to manually guide the blasting lance or turn the workpiece correspondingly.

In a further preferred embodiment of the device of the invention, the blasting chamber is provided with a viewing area, preferably a viewing window, which allows a monitoring of the blasting lance motions and thereby of the blasting process inside the blasting bell. The viewing window is located either above or below the blasting lance. Suitably the viewing window is made of glass or acrylic glass.

Alternately it is also possible to make the entire blasting bell of a transparent impact-resistant plastic material, so that a separate viewing window can be eliminated.

In cases where a stationary blasting chamber is used, the latter has a feeding opening correspondingly sealed against the atmosphere.

Suitable underpressure-producing units are wet and/or dry vacuum devices, pumps, compressors or fans which, according to a further preferred embodiment of the invention, are arranged on the container and are directly connected to the same.

However it is also possible to integrate the unit in the outgoing underpressure line, without leaving the framework of the invention.

Suitably the container for the supply of blasting agent and the container for delivering the blasting agent from the air/dust blasting agent mixture are separated by the discharge funnel of the latter. By means of a slide, valve or a flap, shutter or cellular wheel sluice arranged in the opening of this discharge funnel, this opening in the discharge funnel can be closed, in order to pneumatically separate the two containers from each other.

According to a further advantageous embodiment of the device of the invention, in order to insure that the blasting agent discharged from the carrying air stream is gravity-fed into the supply container and from there reaches the incoming underpressure line without clogging, the discharge funnels in both containers have an opening angle of 30° to 120°, preferably 90°.

Both containers can have a common housing, which is separated only by the discharge funnel into the outwardly discharging space and the supply space.

According to a further preferred feature in the closed circuit operation of the device of the invention, the outlet connection piece on the underpressure-producing aggregate for the exhaust air is connected with a cooling or heating device and the latter in connected with an incoming underpressure line. Thereby also the temperature can be effective during the treatment, depending on the type and nature of the substrate, the coating and the blasting agent.

With the method and the device of the invention paint, spray paint and graffiti can be effectively removed.

The elimination of the entire overpressure or high-pressure system for the compressed air leads to considerable savings in the energy expenditure.

Besides the method of the invention is very simple to perform, because the blasting process at the treatment surface is monitored. The dosed addition of the blasting agent can be set depending on the coating and the substrate, so that even very thin coatings can be removed without problem, with no damage to the substrate.

This sensitivity of the energy input due to the method of the invention makes it possible to perform restorations on flat or curved surfaces, in addition to the already mentioned applications. Also covers made of plastic, leather or densely impregnated textiles can be treated with the method of the invention.

The device has a compact construction and in user-friendly and extremely flexible due to the use of commercially available components, such as wet-dry vacuum devices.

Due to all these features the solution proposed by the invention meets in an improved way the complex requirements of coating removal from various surfaces with high efficiency, safety, in a maintenance-friendly, controllable and compact manner.

SPECIFIC DESCRIPTION

Figure 1:
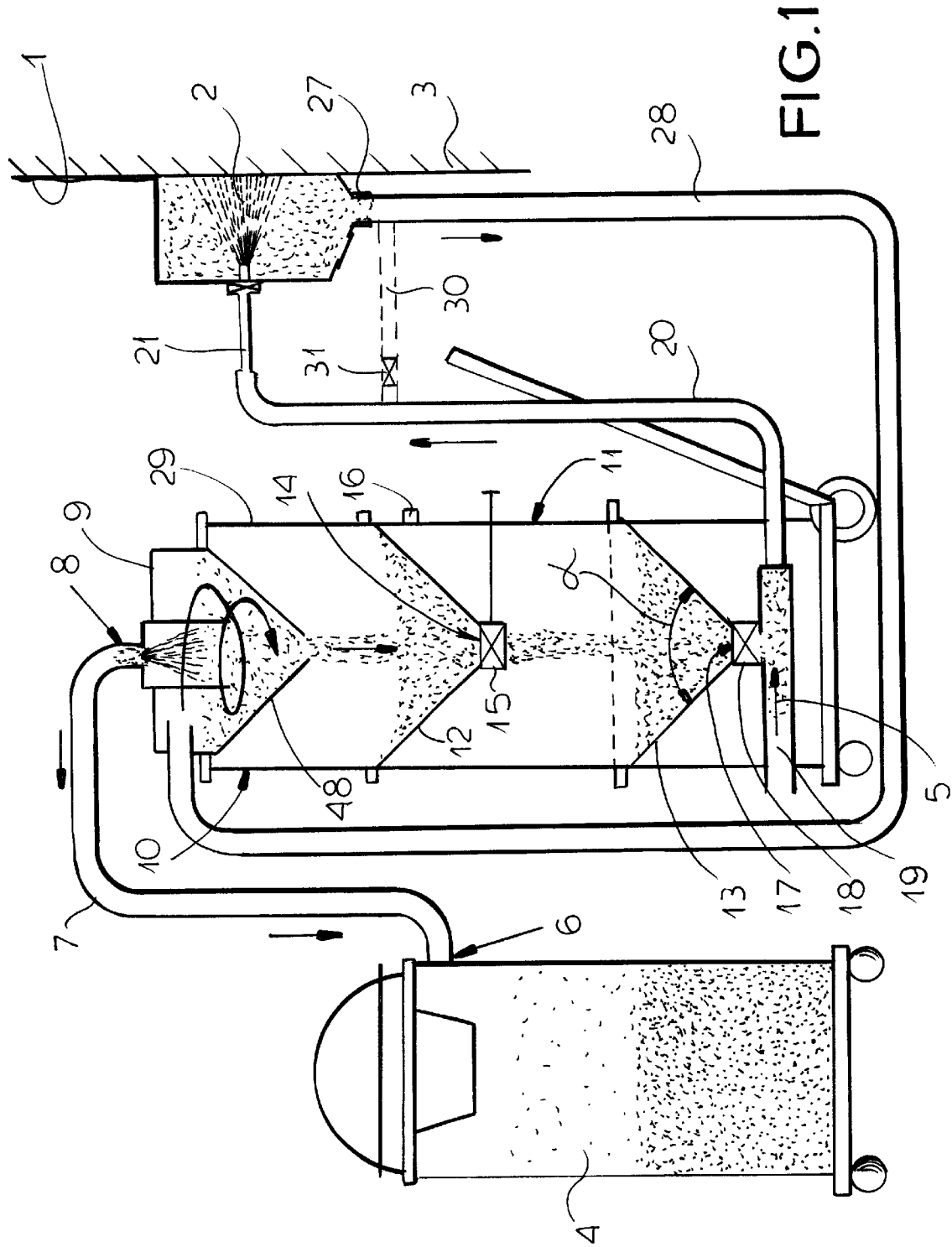
FIG. 1 is a functional diagram of the method of the invention.

FIG. 1 is a functional diagram of the method of the invention for the removal of graffiti coating 1 by means of a dry blasting agent 2 on a flat wall surface 3.

Sodium hydrogen carbonate (baking soda) is used as blasting agent 2.

With a commercially available three-step wet-dry vacuum device 4 a carrying air stream 5 with an air flow rate of approximately 230 m³/min is produced. The suction connection piece 6 of the dry-wet vacuum device 4 is connected with a suction line 7, which via a connection 8 engages centrally in the roof 9 of a container 10 and produces there an underpressure of approximately 80 mbar. The container 10 is set in vertical alignment on the container 11 for the supply of the blasting agent 2. In both containers 10 and 11 the container bottoms are formed by a conical discharge funnel 12, respectively 13 with an opening angle α of respectively 90°.

In the opening 14 of the discharge funnel 12 there is a closing member 15, in this embodiment a slider, which pneumatically seals off the container 10 from the container 11.

The container 11 has an independent ventilation 16 open to the outer atmosphere, so that when the slider 15 is open, the blasting agent 2 can fall due to gravity into the discharge funnel 13 of the container 11 located therebelow.

At the opening 17 of the discharge funnel 13 a doming device 18 is connected with a horizontal injector 19 in vertical alignment, the latter being connected with the incoming underpressure line 20. The blasting agent 2 falls due to gravity through the dosage device 18 in the injector 19, is additionally aspirated by the applied underpressure and flows together with the carrying air stream volume as a carrying air-blasting agent mixture through the flexible incoming underpressure line 20 towards the acceleration tube 21. The amount of blasting agent added through gravity and underpressure equals 0.013% of the carrying air stream volume.

The acceleration tube 21 has an inner diameter d2 of 20 mm, the incoming underpressure line 20 has an inner diameter d1 of 32 mm, Bo that a cross section reduction takes place from the incoming underpressure line 20 to the acceleration tube 21. The diameter ratio d2:d1 amounts in the selected example to 0.625.

The acceleration tube 21 forms an acceleration section L, wherein the blasting particles of the blasting agent 2 are accelerated to a blasting velocity of approximately 60 m/s. The acceleration section L has in this application case a length of 60 cm.

The acceleration tube 21 is detachably connected with a blasting lance 22. The blasting lance 22 has at its opening 23 facing the treatment surface a nozzle 24, through which the blasting agent-carrying air mixture is directed onto the treatment surface.

The blasting lance 22 leads into a blasting chamber 25 designed like a bell which seals off the treatment surface on the wall with respect to the atmosphere.

Therefore in the blasting chamber 25 a corresponding underpressure is applied, which is sufficient for the blasting chamber 25 to be affixed by suction to the treatment surface with its walls 26. The blasting chamber 25 has a funnel-like outgoing suction connection piece 27, to which a flexible outgoing underpressure line 28 is connected. The outgoing underpressure line 28 leads back into the container 10 and ends in the same. This way the circuit is closed.

The blasting agent-air mixture in transported through the incoming underpressure line 20, accelerated in the acceleration section L to the point that the blasting particles assume sufficient energy for the careful detachment of the coating, then flows through the blasting lance 22 and in directed towards the target by the nozzle 24 and propelled against the treatment surface. The blasting agent-air mixture loaded with dust and coating particles flows subsequently through the outgoing underpressure line 28 back into the container 10, where it is tangentially aspirated along the container shell 29 into the separator 48 of the container 10. The loaded contaminated blasting agent is thereby set into rotation. Since the blasting particles of the blasting agent have a far higher mass and therefore have higher energy, the blasting particles fall down on the inner container shell 29 into the discharge funnel 12 where they collect.

The air carrier volume still contaminated with the finest dust or coating particles is aspired through the suction line 7. Dust and coating particles are removed in the wet-dry vacuum device 4 and the cleaned carrier air volume is returned to the circuit.

In case the blasting chamber has to be repositioned or the incoming underpressure line 20 and/or the outgoing underpressure line 28 get clogged, both lines are short-circuited through a line 30 by bypassing the blasting chamber 25. For this purpose the line 30 in provided at its engagement points with cut-off valves 31.

Figure 2:
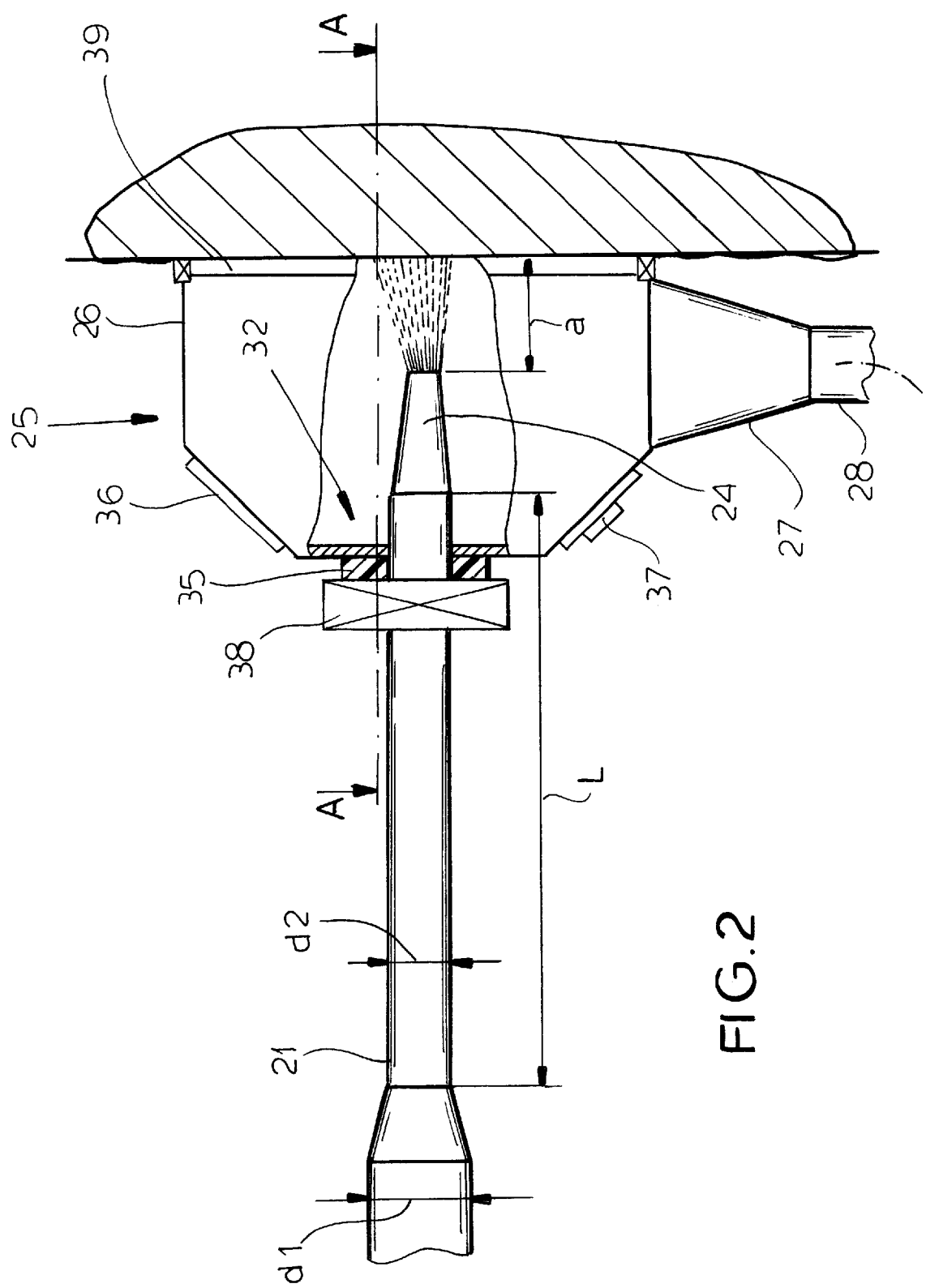
FIG. 2 in a longitudinal section through the blasting bell with acceleration tube and blasting lance.

FIG. 2 shows a section through the blasting chamber 25. The bell-shaped chamber 25 is made of an impact-resistant plastic material, for instance polyamide.

The front sides of its walls 26 are provided with sealing elements 39 of closed call foam material, which, when underpressure is applied, press themselves firmly against the wall, so that in the inner space 32 of the blasting chamber 25 a corresponding underpressure is established.

Figure 3:
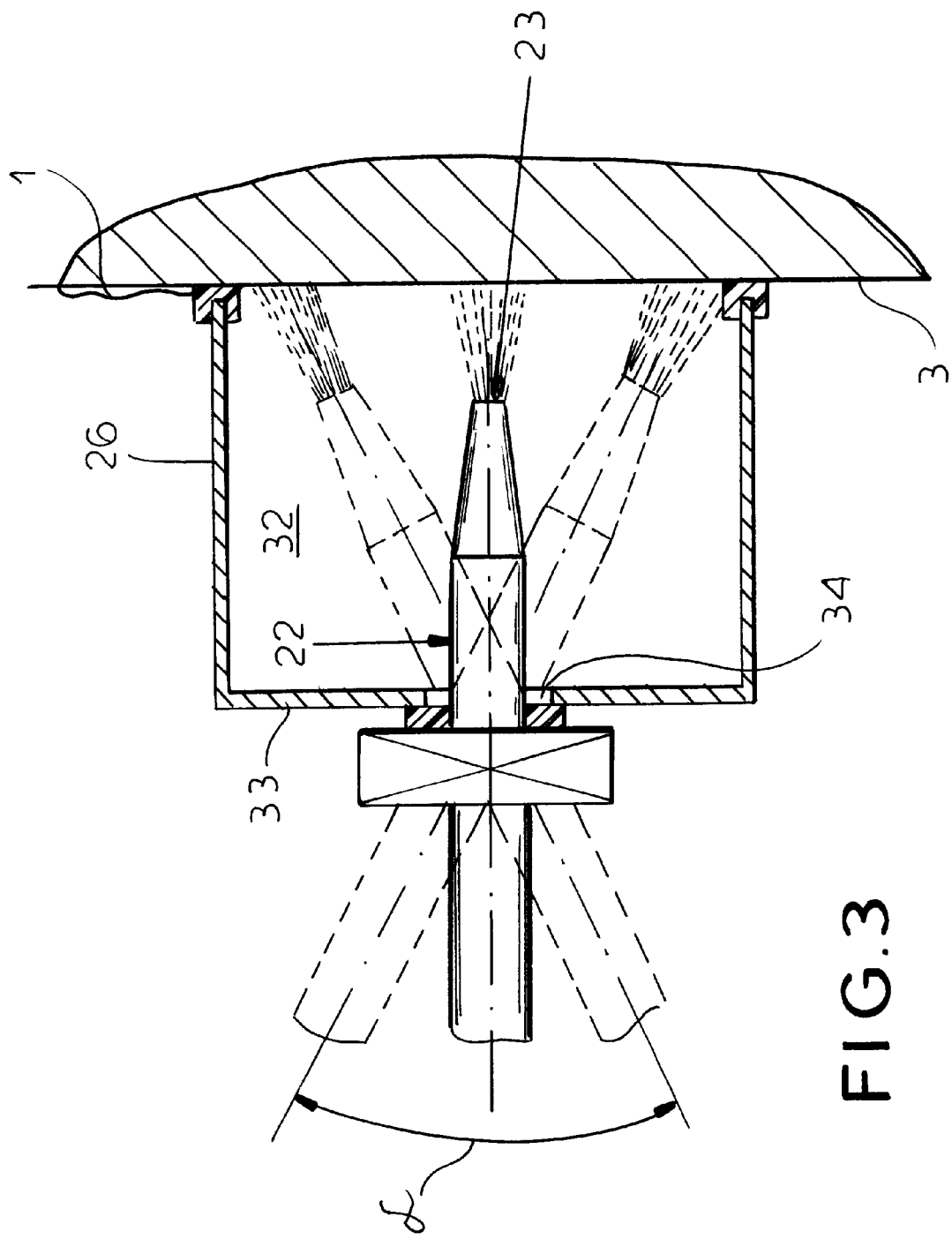
FIG. 3 is a section along the line A—A through the blasting bell according to FIG. 2.

In the front wall 33 of the blasting chamber 25 an opening 34 is made, through which passes the sealed-off blasting lance 22 with fitted nozzle 24. The blasting lance 22 is surrounded by a seal 35, which in turn surrounds the front wall 33 bordering the opening 34. The seal 35 in so elastic that a limited cone-shaped oscillating motion can be imparted to the blasting lance 22 together with the acceleration tube 21 within the inner space 32 of the blasting bell 25, without disturbing the vacuum in the inner space of the blasting bell 25 (see FIG. 3). The opening angle γ of the cone amounts to approximately 90°.

The back and forth motion of the blasting lance 22 inside the blasting bell 26 can be monitored through a viewing window 36. The viewing window 36 in located above the passage opening 34 of the blasting lance 22 in the front wall 33 of the blasting chamber 25 and in made of glass.

In order to be able to move the blasting chamber 25 from one treatment location to another treatment location, in the wall 26 a ventilation valve 37 is arranged, through which the blasting chamber 25 can be vented when the incoming line 20 and the outgoing line 28 are short-circuited.

A stop 38 is slid over and arrested on the blasting lance 22, by means of which the distance a of the blasting lance 22, including the nozzle 24 to the treatment surface can be set.

Depending on the nature of the substrate, the type of coating to be removed, it is possible to precisely adjust the blasting distance.

Figure 4:
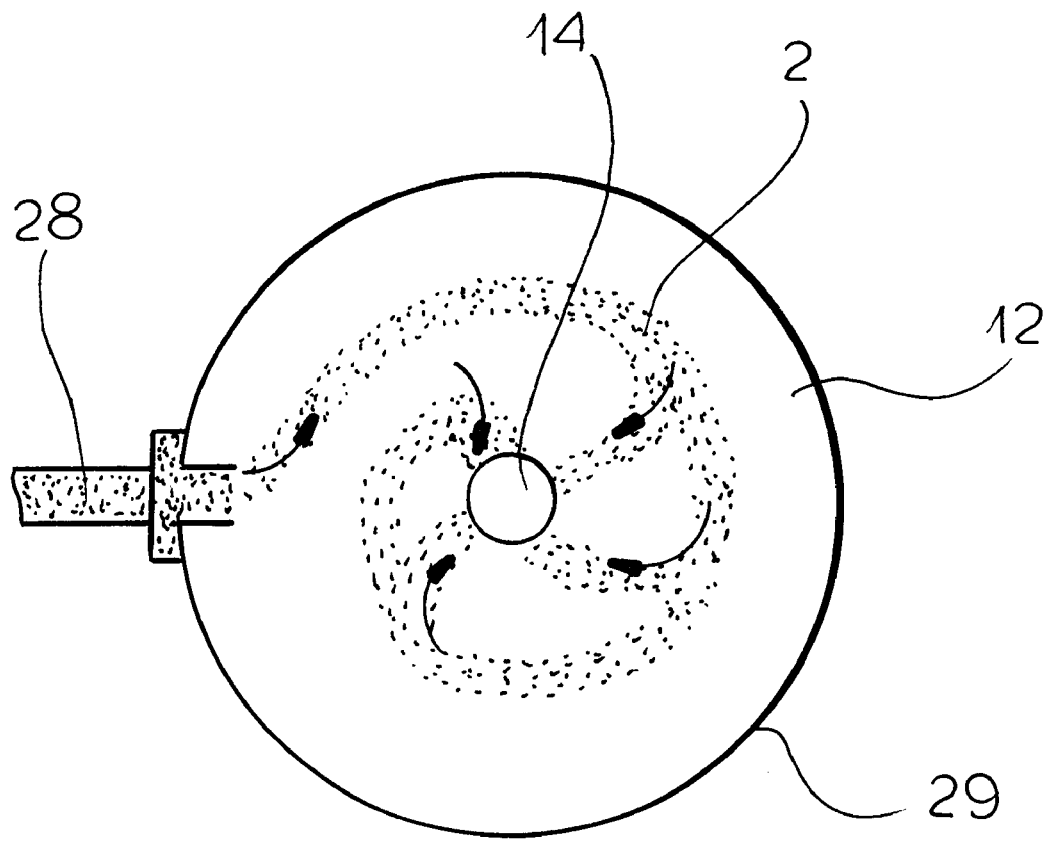
FIG. 4 illustrates the tangential integration of the incoming underpressure line in the container.

FIG. 4 shows the tangential engagement of the outgoing underpressure line 28 in the inner space of the container 10.

Figure 5:
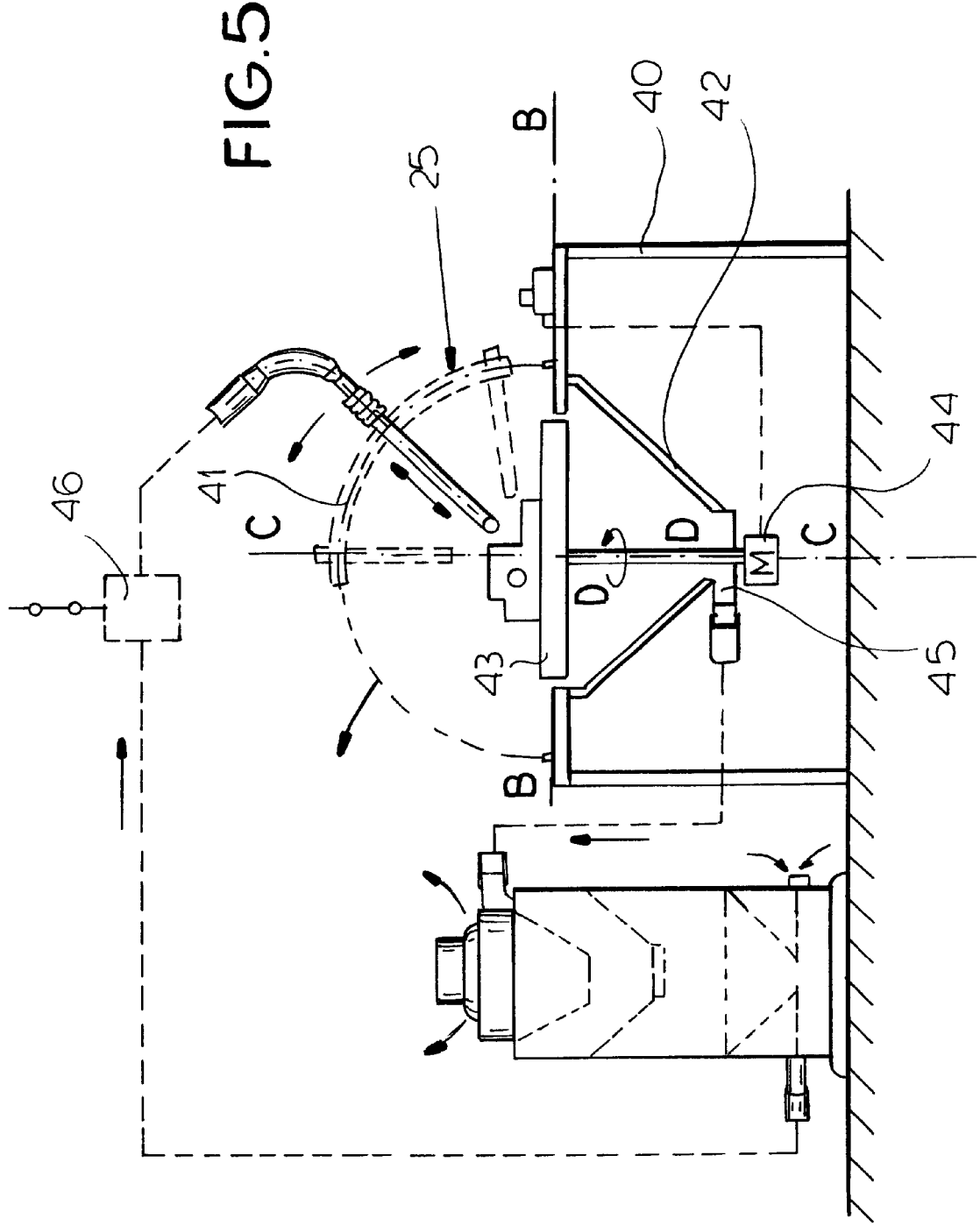
FIG. 5 is a representation of the device of the invention with closed blasting chamber and wetting device.

In FIG. 5 a stationary variant of the device is shown. The acceleration tube 21 and the blasting lance 22 are here made in one piece. The blasting chamber 25 is mounted on a table 40 and consists of a hemispherical hood 41 with a collection funnel 42 positioned on the hood 41. In the connection plane B—B of hood 41 and collection funnel 42, there is a blasting table 43 in the shape of a rotary plate. The drive axis C—C of the blasting table 43 is guided in the funnel axis D—D, penetrates the collection funnel 42 and is connected outside the collection funnel with a drive 44, for instance an electric motor. On the collection funnel 42 there is a suction connection piece 45 arranged perpendicularly to the funnel axis D—D to which the outgoing underpressure line 28 in connected. The outgoing underpressure line 28 is connected with the device 4 fastened to the head of the container 10. In the incoming underpressure line 20 a wetting device 46 in arranged downstream before the acceleration tube 21, which sprays cleaning fluid on the blasting agent.

Figure 6:
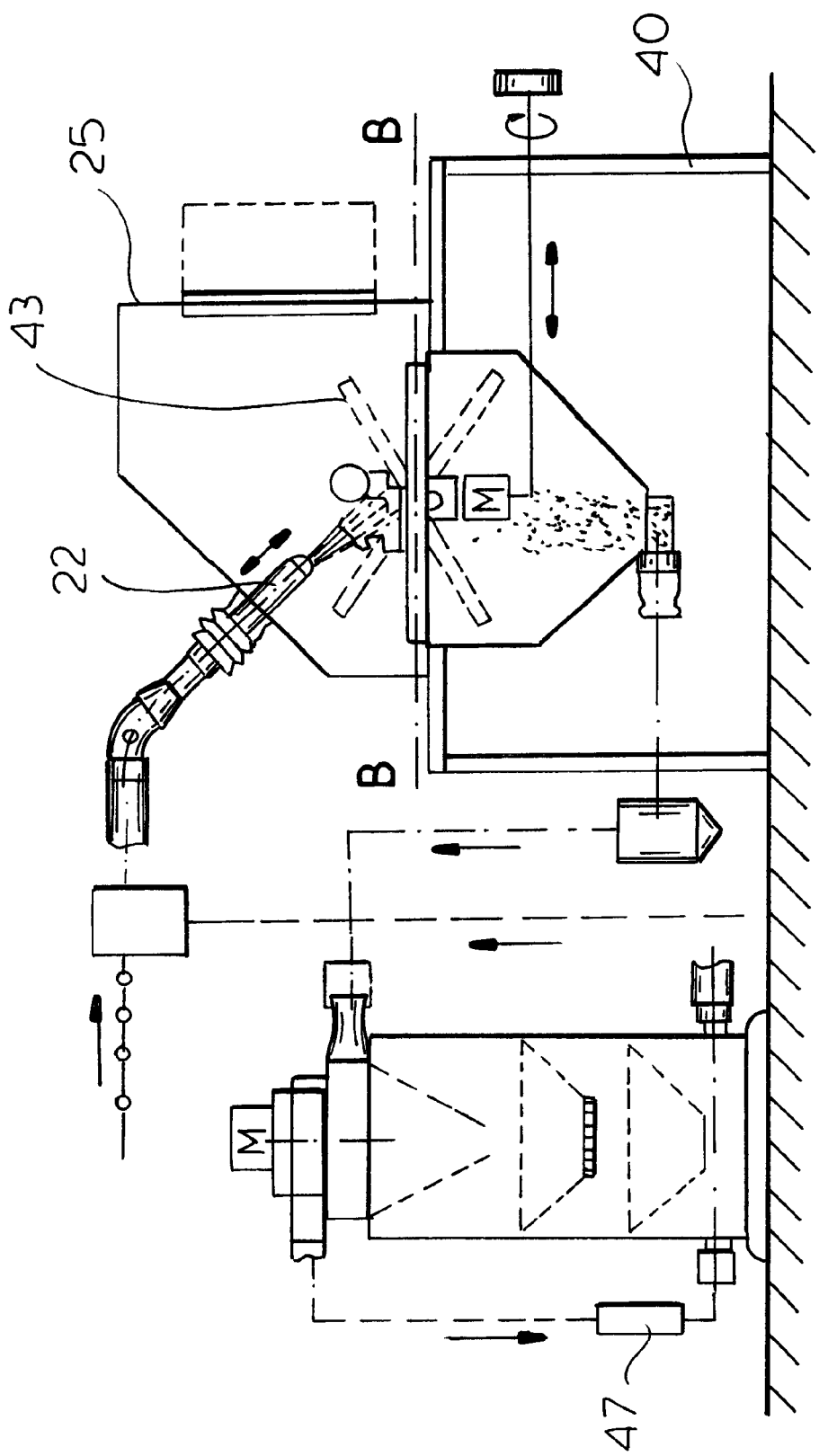
FIG. 6 is an embodiment variant according to FIG. 5 with additional heating or cooling device for the exhaust air flow and FIG. 7 is a perspective view of the suction plate with wire mesh and blasting bell.

FIG. 6 represents a further stationary variant of the device of the invention. The blasting chamber 25 has here a swingable blasting table 43, whose swing axis is located in the connection plane B—B. The blasting table is driven by a drive 44 arranged in the collection funnel 42, which converts the rotary motion of the motor into an oscillating motion. Opposed to the variant of FIG. 5, the exhaust air of the aggregate 4 in returned to the incoming underpressure line 20 via a heating and cooling device 47.

Figure 7:
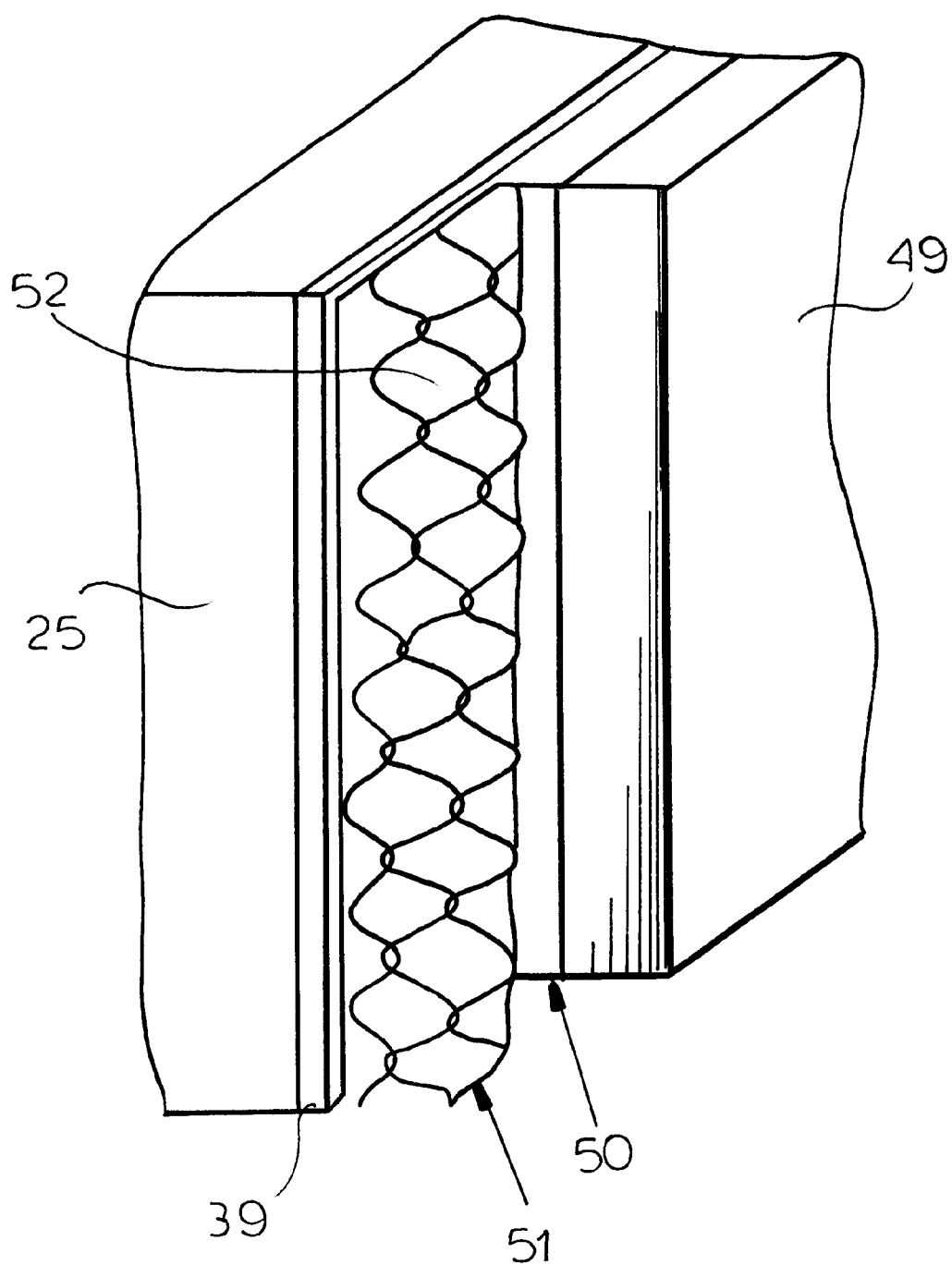

In FIG. 7 a flexible suction plate 49 is shown, which covers a surface 51 provided with openings 52 (wire mesh) with respect to the blasting bell 25. The suction plate 49 is provided with a sealing layer 50, which seals against the walls of the blasting bell due to the underpressure applied to the blasting bell 25. Then the wire mesh can be blasted without any problems with the blasting agent.

What is claimed is:

1. A method of treating a surface selected from the group which consists of stone, concrete, wood, metal, plastic, glass, ceramic and paper to remove a deposit therefrom, which comprises the steps of:

a) generating an underpressure of 50 to 300 mbar in a blasting chamber in which said surface is exposed and aspirating an air stream through a blasting lance into said chamber and trained against said surface;

b) feeding a blasting agent to said air stream at a location upstream of said lance in an amount of 0.01 to 25.0% by volume of said air stream, whereby a blasting agent-air mixture is formed upstream of said blasting lance, c) rectilinearly accelerating said blasting agent-air mixture to a blasting velocity of about 20 to 80 m/s before said mixture enters said blasting lance whereby said mixture is directed against said surface;

c) relatively displacing said surface and said lance in a rhythmic rotation so that said mixture is displaced across said surface to remove said deposit therefrom and removed dust, dirt and removed matter is formed in said mixture;

e) withdrawing said mixture together with the removed dust, dirt and removed matter from said chamber by said underpressure and setting the removed mixture, dust, dirt and removed matter into rotation to separate the blasting agent from a contaminated blasting agent-air mixture by mass;

f) collecting the separated blasting agent, drying the separated blasting agent and recirculating the separated blasting agent to air introduced into said lance in a blasting agent recirculation; and g) cleaning air from which said blasting agent has been separated and selectively supplying at least one fluid selected from the group consisting of fresh air and clean air to said lance.

2. An apparatus for treating a surface selected from the group which consists of stone, concrete, wood, metal, plastic, glass, ceramic and paper to remove a deposit therefrom which comprises:

a blasting chamber in which said surface is exposed;

a blasting lance extending into said chamber and trained against said surface;

a rectilinear acceleration tube connected to said lance for accelerating a blast agent-air mixture to an increased velocity prior to entry into said lance;

a flexible incoming line receiving said mixture and connected to said acceleration tube, said acceleration tube having a reduced diameter in relation to said incoming line;

a container formed with a discharge funnel at a lower portion thereof receiving said blasting agent from an upper location in said funnel and equipped with a dosage device for metering the blasting agent into air supplied to said incoming line and drawn therethrough by aspiration of air, blasting agent and removed dust, dirt and removed matter from said chamber;

a separator disposed at a head of said container and connected to said chamber by an underpressure line, said underpressure line opening tangentially into said separator for aspirating the removed mixture of blasting agent, air, dust, dirt and removed matter, into said separator and separating the removed mixture into rotation to separate the blasting agent from a contaminated blasting air mixture by mass, whereby the separated blasting agent falls in said container toward said discharge funnel; and an underpressure producing unit connected to said separator withdrawing said contaminated blasting agent-air mixture therefrom.

3. The apparatus defined in claim 2 wherein said acceleration tube extends rectilinearly over a length which is 5 to 50 times an internal diameter of said inking line, said acceleration tube having an inner diameter which is 0.1 to 0.9 times the internal diameter of the incoming line.

4. The apparatus defined in claim 2 wherein said acceleration tube is directly connected to a dosage device.

5. The apparatus defined in claim 2 wherein the acceleration tube is a telescopic tube.

6. The apparatus defined in claim 2, further comprising means for releasably and replaceably fastening the blasting lance to said acceleration tube.

7. The apparatus defined in claim 2 wherein said blasting lance is disposed in an opening in a wall of said blasting chamber for swinging within a cone of approximately 90°.

8. The apparatus defined in claim 2 further comprising a closable short circuit line connecting said incoming line to said underpressure line.

9. The apparatus defined in claim 2, further comprising a light enabling an interior of said blasting chamber to be viewed from an exterior thereof and a ventilating valve connected to said blasting chamber.

10. The apparatus defined in claim 2, further comprising an independent ventilating opening connecting with the atmosphere on said container.

11. The apparatus defined in claim 2, further comprising a funnel shaped bottom provided with a closure above said outlet funnel and separating a lower portion of said container from an upper portion thereof.

12. The apparatus defined in claim 2, further comprising a selectively operable temperature control device along said incoming line.

13. The apparatus defined in claim 2 further comprising a collection funnel on said blasting chamber connected to said underpressure line.

14. The apparatus defined in claim 2 wherein said blasting chamber comprises a bell open an one side and sealingly and slidably engaging said surface.

15. The apparatus defined in claim 14 wherein said open side of said blasting bell is provided with a suction plate for sealing against a wire mesh so that said suction plate covers openings in said wire mesh.

16. The apparatus defined in claim 15 wherein said suction plate is flexible and has a sealing layer of closed-cell foam rubber.

17. The apparatus defined in claim 14 wherein said sealing bell has bell walls provided with sealing elements and adapted to engage parts to be treated.

18. The apparatus defined in claim 17 wherein said sealing elements are selected from the group which consists of closed-cell foam rubber, foils, brushes, rubber lips, packed sealing elements, latex or rubber hoses, and profile seals.

19. The apparatus defined in claim 14 wherein said blasting bell has walls whose end surfaces which are flat relative to one another.

20. The apparatus defined in claim 14 wherein said blasting bell is adapted to be positioned over a contoured surface, said bell having walls which are adjustable to different surface configurations.

21. The apparatus defined in claim 2 wherein said blasting chamber is closed and has a stationary hood and a connection funnel connectable to said underpressure line, a blasting table being disposed in a connection plane between said hood and said collection funnel.

22. The apparatus defined in claim 21 wherein said blasting table is a rotary plate.

23. The apparatus defined in claim 21 wherein said blasting table is a swinging plate which can swing about an axis in said connection plane.

24. The apparatus defined in claim 21 wherein said blasting chamber is provided with a window in a front wall thereof.

25. The apparatus defined in claim 21 wherein said blasting chamber is provided with at least one feed opening.

26. The apparatus defined in claim 2 wherein said blasting chamber is composed of a polyamide or polypropylene.

27. The apparatus defined in claim 2 wherein said blasting lance and said acceleration tube are in one piece.

28. The apparatus defined in claim 2 wherein said blasting lance is provided with a replaceable nozzle.

29. The apparatus defined in claim 2 wherein said blasting lance is provided with an adjustable stop.

30. The apparatus defined in claim 2 further comprising a ball and socket joint mounting said blasting lance in a wall of said blasting chamber.

31. The apparatus defined in claim 2, further comprising a seal securing said blasting lance in an opening of a wall of the blasting chamber.

32. The apparatus defined in claim 31 wherein said seal is a shaft seal.

33. The apparatus defined in claim 31 wherein said seal is flanged to said wall.

34. The apparatus defined in claim 2 wherein said underpressure producing unit is a vacuum device.

35. The apparatus defined in claim 2 wherein said underpressure producing unit is connected to said container by a suction line.

36. The apparatus defined in claim 2 wherein said underpressure producing unit is arranged on said container.

37. The apparatus defined in claim 2 wherein said underpressure producing unit is integrated in said underpressure line.

38. The apparatus defined in claim 2, further comprising a valve disposed between said separator and said discharge funnel for controlling the passage of said blasting agent from said separator to said funnel.

39. The apparatus defined in claim 2 wherein said funnels have opening angles of 60 to 120°.

* * * * *